US010458420B2

(12) United States Patent
Kawashima et al.

(10) Patent No.: US 10,458,420 B2
(45) Date of Patent: Oct. 29, 2019

(54) METHOD FOR CONTROLLING MOTOR-DRIVEN COMPRESSOR CONFIGURED TO BE INSTALLED IN VEHICLE

(71) Applicant: KABUSHIKI KAISHA TOYOTA JIDOSHOKKI, Kariya-shi, Aichi-ken (JP)

(72) Inventors: Takashi Kawashima, Kariya (JP); Yoshiki Nagata, Kariya (JP); Kazuki Najima, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 433 days.

(21) Appl. No.: 15/468,307

(22) Filed: Mar. 24, 2017

(65) Prior Publication Data

US 2017/0284409 A1   Oct. 5, 2017

(30) Foreign Application Priority Data

Mar. 29, 2016   (JP) .................... 2016-066483

(51) Int. Cl.
*F04D 27/00* (2006.01)
*B60H 1/32* (2006.01)
(Continued)

(52) U.S. Cl.
CPC ......... *F04D 27/004* (2013.01); *B60H 1/3205* (2013.01); *B60H 1/3222* (2013.01); *F04B 27/08* (2013.01); *F04B 35/04* (2013.01); *F04B 49/02* (2013.01); *F04B 49/06* (2013.01); *F04B 49/20* (2013.01); *F04C 23/008* (2013.01);
(Continued)

(58) Field of Classification Search
CPC ............. Y02T 10/7005; Y02T 10/7275; B60L 2240/423; B60L 50/51
See application file for complete search history.

(56) References Cited

U.S. PATENT DOCUMENTS

| | | | |
|---|---|---|---|
| 2013/0015800 A1* | 1/2013 | Ramamurthy | ........ H02P 29/026 318/434 |
| 2014/0210379 A1* | 7/2014 | Kato | ........ H02P 6/153 318/139 |
| 2014/0312810 A1* | 10/2014 | Toda | ........ B60L 50/53 318/139 |

FOREIGN PATENT DOCUMENTS

| | | |
|---|---|---|
| JP | 7-120081 A | 5/1995 |
| JP | 2005344647 A | 12/2005 |
| JP | 2008202905 A | 9/2008 |

* cited by examiner

*Primary Examiner* — Bickey Dhakal
*Assistant Examiner* — Zoheb S Imtiaz
(74) *Attorney, Agent, or Firm* — Sughrue Mion, PLLC

(57) ABSTRACT

The control section controls the electric motor to be driven such that the number of revolutions becomes equal to the target number of revolutions. If the control section sets the target number of revolutions to a number of revolutions of the electric motor requested by another control section, the control section changes the number of revolutions of the electric motor at an increase rate lower than or equal to the upper limit value of the increase rate or at a decrease rate lower than or equal to the upper limit value of the decrease rate. If the control section sets the target number of revolutions to a number-of-revolutions limit value, which is determined based on the voltage of a vehicle battery, the control section is able to decrease the number of revolutions of the electric motor at a decrease rate exceeding the upper limit value.

2 Claims, 3 Drawing Sheets

(51) Int. Cl.
  *F04B 27/08* (2006.01)
  *F04B 35/04* (2006.01)
  *F04B 49/20* (2006.01)
  *F04C 28/08* (2006.01)
  *F04C 29/00* (2006.01)
  *F04D 25/06* (2006.01)
  *F04C 23/00* (2006.01)
  *F04B 49/02* (2006.01)
  *F04B 49/06* (2006.01)

(52) U.S. Cl.
  CPC .......... *F04C 28/08* (2013.01); *F04C 29/0085* (2013.01); *F04D 25/0673* (2013.01); *B60H 2001/3272* (2013.01); *B60H 2001/3292* (2013.01); *F04C 2240/40* (2013.01); *F04C 2240/403* (2013.01); *F04C 2270/051* (2013.01); *F04C 2270/0525* (2013.01); *F04C 2270/605* (2013.01)

METHOD FOR CONTROLLING MOTOR-DRIVEN COMPRESSOR CONFIGURED TO BE INSTALLED IN VEHICLE

BACKGROUND OF THE INVENTION

The present invention relates to a method for controlling a motor-driven compressor configured to be installed in a vehicle.

Conventionally, there is a motor-driven compressor that is configured to be installed in a vehicle and is driven by an inverter. The inverter receives electric power from a battery of a vehicle and converts DC power into AC power. The motor-driven compressor is driven at a number of revolutions commanded by a control device installed in the vehicle. The number of revolutions commanded by the control device is represented by discrete values. Therefore, if the number of revolutions is changed frequently in response to commands by the control device, rapid increase or decrease of the number of revolutions repeatedly happens, thus aggravating noise and vibration (NV). To solve this problem, as shown in FIG. 4, the motor-driven compressor is driven at a number of revolutions having a change per unit time that is lower than that of a commanded number of revolutions, which is commanded by the control device.

The motor-driven compressor receives electric power from the battery of the vehicle and is influenced by the battery voltage. For example, if the motor-driven compressor operates at a high number of revolutions and is stopped when the battery voltage is low, the voltage of the counter electromotive force (the counter electromotive voltage) of the motor of the motor-driven compressor may exceed the battery voltage. If this is the case, an electric current flows from the motor to the battery via the inverter of the motor-driven compressor. At this time, if the counter electromotive voltage of the motor is high, an excessive electric current flows through the inverter, thus damaging the switching elements of the inverter. To avoid this, the maximum number of revolutions at which the motor-driven compressor can be operated must be limited based on the battery voltage.

Japanese Laid-Open Patent Publication No. 7-120081 discloses an inexpensive and small-sized control-drive device for a motor-driven compressor that prevents a motor-driven compressor from being stopped through overcurrent protection effectuated by voltage change of a power source and, without adversely influencing lubricating function in the compressor, decreases the blown air temperature at a transient time of air conditioning and increases the increase speed of the blown air temperature. The control-drive device includes a means for generating DC voltage, a motor-driven compressor that incorporates a motor and compresses refrigerant for air conditioning, and an inverter. The control-drive device causes the increase speed of the frequency or the increase speed of the voltage of the inverter to be higher in a low number-of-revolutions range in a variable number-of-revolutions range than in a high number-of-revolutions range. The control-drive device also causes the decrease speed of the frequency or the decrease speed of the voltage of the inverter to be higher in the high number-of-revolutions range of the variable number-of-revolutions range than in the low number-of-revolutions range.

The battery voltage varies depending on the condition of the vehicle. Thus, the power source voltage of the motor-driven compressor can rapidly decrease in some cases. At the time of such rapid decrease of the power source voltage, even if a rapid decrease of the number of revolutions of the motor-driven compressor is attempted, the number of revolutions decreases only slowly at a decrease rate that has been determined in consideration of the NV. Therefore, if the motor-driven compressor operates at a high number of revolutions and is stopped when the battery voltage is low, the amount of the electric current flowing in the motor of the motor-driven compressor is greater than before the compressor is stopped as shown in FIG. 5. An excessive electric current may thus flow through the battery, damaging the inverter.

To prevent damage to the switching elements of the inverter caused by an excessive electric current flowing through the inverter, switching elements having a high withstand voltage may be employed. However, this increases costs and enlarges the inverter.

According to Japanese Laid-Open Patent Publication No. 7-120081, the decrease speed of the frequency or voltage of the inverter is higher in the high number-of-revolutions range of the variable number-of-revolutions range than in the low number-of-revolutions range. However, the publication does not include description regarding damage to the switching elements of the inverter caused by stopping the motor-driven compressor operating at a high number of revolutions when the battery voltage is low.

SUMMARY OF THE INVENTION

Accordingly, it is an objective of the present invention to provide a method for controlling a motor-driven compressor configured to be installed in a vehicle capable of, while restraining a quick change of the number of revolutions of the motor-driven compressor, restraining damage to switching elements of an inverter of the motor-driven compressor caused by stopping the motor-driven compressor at the time of a rapid voltage change of a vehicle battery.

To achieve the foregoing objective and in accordance with a first aspect of the present invention, a method for controlling acceleration and deceleration of a motor-driven compressor configured to be installed in a vehicle is provided. The motor-driven compressor includes an electric motor driven with supply of electric power from a battery and a control section that controls drive of the electric motor. The control section has an upper limit value of an increase rate of a number of revolutions per unit time of the electric motor and an upper limit value of a decrease rate of the number of revolutions per unit time of the electric motor. The control section sets a target number of revolutions and controls the electric motor to be driven such that the number of revolutions of the electric motor becomes equal to the target number of revolutions. If the control section sets the target number of revolutions to a number of revolutions of the electric motor requested by another control section, the control section changes the number of revolutions of the electric motor at an increase rate lower than or equal to the upper limit value of the increase rate or a decrease rate lower than or equal to the upper limit value of the decrease rate. If the control section sets the target number of revolutions to a number-of-revolution limit value determined based on a voltage of the battery, the control section is able to decrease the number of revolutions of the electric motor at a decrease rate that exceeds the upper limit value of the decrease rate.

In accordance with a second aspect of the present invention, a motor-driven compressor configured to be installed in a vehicle is provided. The motor-driven compressor includes an electric motor driven with supply of electric power from a battery and a control section that controls drive of the electric motor. The control section has an upper limit value of an increase rate of a number of revolutions per unit time of the electric motor and an upper limit value of a decrease rate of the number of revolutions per unit time of the electric motor. The control section sets a target number of revolutions and controls the electric motor to be driven such that the number of revolutions of the electric motor becomes equal to the target number of revolutions. If the control section sets the target number of revolutions to a number of revolutions of the electric motor requested by another control section, the control section changes the number of revolutions of the electric motor at an increase rate lower than or equal to the upper limit value of the increase rate or a decrease rate lower than or equal to the upper limit value of the decrease rate. If the control section sets the target number of revolutions to a number-of-revolution limit value determined based on a voltage of the battery, the control section is able to decrease the number of revolutions of the electric motor at a decrease rate that exceeds the upper limit value of the decrease rate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A method for controlling a motor-driven compressor configured to be installed in a vehicle according to one embodiment of the present invention will now be described with reference to FIGS. 1 to 3.

A motor-driven compressor is used in an air conditioner configured to be installed in a vehicle. The motor-driven compressor includes a compressing portion, which compresses and discharges refrigerant, an electric motor serving as a drive source of the compressing portion, and an inverter that drives the electric motor.

Figure 1:
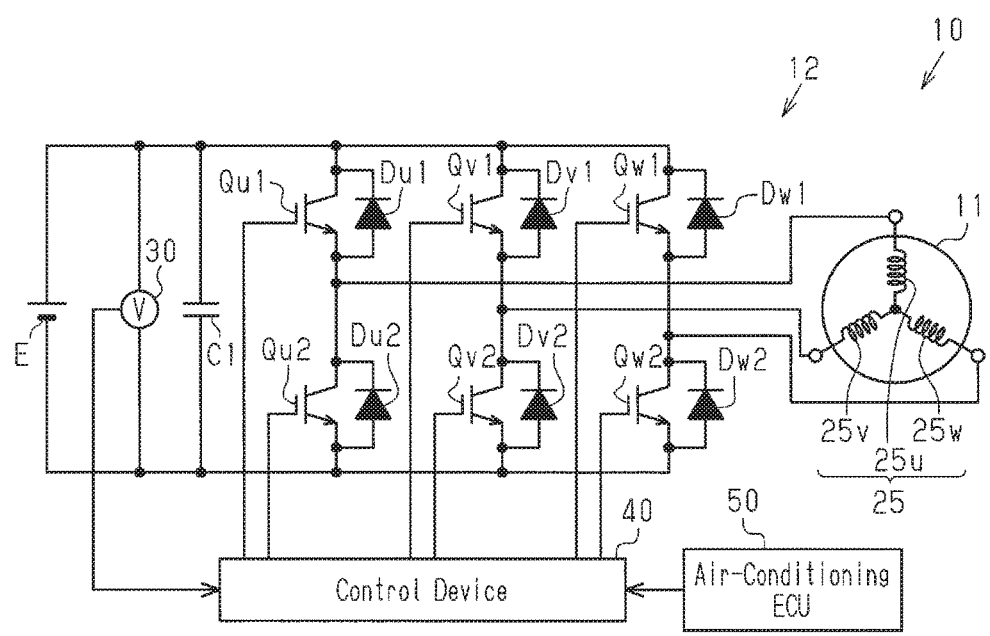
FIG. 1 is a circuit diagram representing the configuration of a motor-driven compressor configured to be installed in a vehicle according to one embodiment of the present invention.
Figure 2:
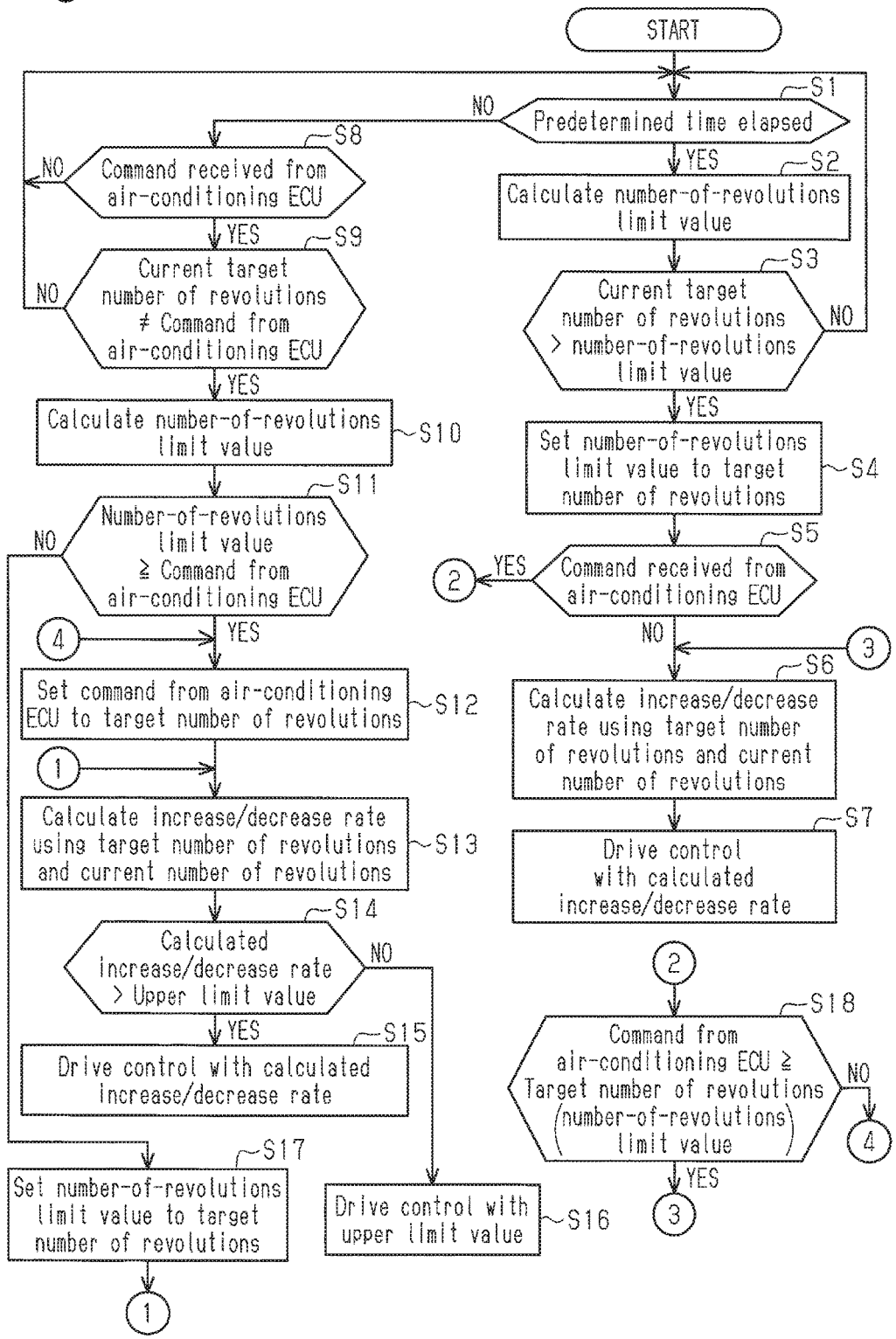
FIG. 2 is a flowchart representing drive-control of an electric motor.

As shown in FIG. 1, a motor-driven compressor 10 includes an electric motor 11 and an inverter 12 serving as a drive circuit that drives the electric motor 11. A coil 25 of the electric motor 11 has a three-phase structure having a u-phase coil 25$u$, a v-phase coil 25$v$, and a w-phase coil 25$w$.

The electric motor 11 is a three-phase motor. The u-phase coil 25$u$, the v-phase coil 25$v$, and the w-phase coil 25$w$ are connected in a Y-connection.

The inverter 12 includes power switching elements Qu1, Qu2 corresponding to the u-phase coil 25$u$, power switching elements Qv1, Qv2 corresponding to the v-phase coil 25$v$, and power switching elements Qw1, Qw2 corresponding to the w-phase coil 25$w$.

The power switching elements Qu1, Qu2, Qv1, Qv2, Qw1, and Qw2 (hereinafter, referred to simply as the power switching elements Qu1 to Qw2) are configured as IGBTs. The power switching elements Qu1, Qu2 are connected in series through a connection wire. The connection wire is connected to the u-phase coil 25$u$. The serially-connected body of the power switching elements Qu1, Qu2 receives DC power from a vehicle battery E. The other power switching elements Qv1, Qv2, Qw1, and Qw2, are connected in the same manner as the power switching elements Qu1 and Qu2, except for that the corresponding coils are different. Therefore, detailed descriptions of the power switching elements Qv1, Qv2, Qw1, Qw2 are omitted herein.

The inverter 12 has diodes Du1, Dv1, Dw1, Du2, Dv2, and Dw2, which are connected in parallel with the power switching elements Qu1 to Qw2, and a capacitor C1, which is connected in parallel with the vehicle battery E.

The motor-driven compressor 10 includes a control device 40 serving as a control section that controls the inverter 12. Specifically, the control device 40 controls switching operation of each of the power switching elements Qu1 to Qw2. The control device 40 drives the electric motor 11 by periodically turning on and off the power switching elements Qu1 to Qw2.

The control device 40 has an upper limit value of the increase rate of the number of revolutions per unit time of the electric motor 11 and an upper limit value of the decrease rate of the number of revolutions per unit time of the electric motor 11. Also, the control device 40 sets a target number of revolutions and controls the drive of the electric motor 11 such that the number of revolutions of the electric motor 11 becomes equal to the target number of revolutions.

The control device 40 is electrically connected to an air-conditioning ECU 50 serving as another control section. When the target number of revolutions is set to the number of revolutions of the electric motor 11 requested by the air-conditioning ECU 50, the control device 40 changes the number of revolutions of the electric motor 11 at either an increase rate lower than or equal to the upper limit value of the increase rate or a decrease rate lower than or equal to the upper limit value of the decrease rate.

As shown in FIG. 1, the motor-driven compressor 10 includes a voltage sensor 30 serving as a voltage detecting section, which detects the voltage of the vehicle battery E (the vehicle battery voltage). The voltage sensor 30 transmits a detection result of the vehicle battery voltage to the control device 40.

The control device 40 includes a CPU and a memory. The memory stores a map or expression representing the relationship between the vehicle battery voltage and a number-of-revolutions limit value of the electric motor 11. The number-of-revolutions limit value is determined based on the amount of an electric current flowing in the inverter 12 due to the difference between the counter electromotive force produced at the time the inverter 12 is stopped and the vehicle battery voltage. That is, the number-of-revolutions limit value is a number of revolutions of the electric motor 11 at which the inverter 12 is not damaged by stopping the inverter 12. Therefore, the number-of-revolutions limit value is set such that a greater amount of electric current can be supplied when switching elements having a higher withstand voltage are employed. That is, the number-of-revolutions limit value varies depending on the specifications of the inverter 12.

The memory stores the upper limit value of the increase rate of the number of revolutions per unit time of the electric motor 11 and the upper limit value of the decrease rate of the number of revolutions per unit time of the electric motor 11. Specifically, the control device 40 has the upper limit value of the increase rate of the number of revolutions per unit time of the electric motor 11 and the upper limit value of the decrease rate of the number of revolutions per unit time of the electric motor 11. Specifically, the number of revolutions per unit time of the electric motor 11 is represented by the unit rpm/s.

The number-of-revolutions limit value decreases as the vehicle battery voltage decreases. Therefore, even when the command value from the air-conditioning ECU 50 is higher than the number-of-revolutions limit value, the control device 40 controls the inverter 12 such that the number of revolutions of the electric motor 11 becomes equal to the number-of-revolutions limit value. Specifically, if the target number of revolutions is set to the number-of-revolutions limit value, the control device 40 decreases the number of revolutions of the electric motor 11 at a decrease rate exceeding the upper limit value of the decrease rate when necessary. "Decreasing the number of revolutions of the electric motor 11 at a decrease rate exceeding the upper limit value of the decrease rate when necessary" indicates the following procedure. Specifically, when the number of revolutions of the electric motor 11 is decreased as the vehicle battery voltage decreases, in other words, the target number of revolutions is set to the number-of-revolutions limit value, the number of revolutions of the electric motor 11 may be decreased at a decrease rate lower than or equal to the upper limit value of the decrease rate, as long as such decrease does not cause any problem.

The drive-control of the electric motor 11 by the control device 40 after the electric motor 11 is started will now be described with reference to FIGS. 2 and 3. The control device 40 receives a command from the air-conditioning ECU 50 and then controls the inverter 12 to start the electric motor 11. Afterwards, the control device 40 controls the inverter 12 according to the flowchart represented in FIG. 2, thus controlling the drive of the electric motor 11.

The procedure performed by the control device 40 at the time of starting the electric motor 11 is the same as the procedure from Step S9 to Step S17, which will be described below, after the control device 40 receives a command from the air-conditioning ECU 50.

In Step S1, the control device 40 determines whether a predetermined time has elapsed. The predetermined time refers to, for example, a time period of approximately 100 ms (milliseconds). If the predetermined time has elapsed, the control device 40 advances the control process to Step S2 and calculates the number-of-revolutions limit value. The number-of-revolutions limit value is calculated using the current vehicle battery voltage, which is provided by the voltage sensor 30, and the map representing the relationship between the vehicle battery voltage and the number-of-revolutions limit value.

After calculating the number-of-revolutions limit value, the control device 40, in Step S3, determines whether the current target number of revolutions is greater than the number-of-revolutions limit value. If the current target number of revolutions is lower than or equal to the number-of-revolutions limit value, the control device 40 returns the control process to Step S1 without updating the target number of revolutions. If the current target number of revolutions is greater than the number-of-revolutions limit value, the control device 40 advances the control process to Step S4 and updates the target number of revolutions. Specifically, in Step S4, the control device 40 sets the number-of-revolutions limit value to the target number of revolutions.

Subsequently, the control device 40 advances the control process to Step S5 and determines whether the control device 40 has received a command from the air-conditioning ECU 50. If the control device 40 has not received any command from the air-conditioning ECU 50, the control device 40 advances the control process to Step S6 and calculates the increase or decrease rate using the target number of revolutions and the current number of revolutions. Next, the control device 40 advances the control process to Step S7 and controls the drive of the electric motor 11 based on the calculated increase or decrease rate.

If, in Step S1, the predetermined time has not elapsed, the control device 40 advances the control process to Step S8 and determines whether the control device 40 has received a command from the air-conditioning ECU 50. If the control device 40 has not received any command from the air-conditioning ECU 50, the control device 40 returns the control process to Step S1. If the control device 40 has received a command from the air-conditioning ECU 50, the control device 40 advances the control process to Step S9 and determines whether the current target number of revolutions is unequal to the command value (hereinafter, referred to as the commanded number of revolutions) from the air-conditioning ECU 50. When the current target number of revolutions is equal to the command value from the air-conditioning ECU 50, the control device 40 returns the control process to Step S1.

If the current target number of revolutions is unequal to the command value from the air-conditioning ECU 50, the control device 40 advances the control process to Step S10 and calculates the number-of-revolutions limit value. Specifically, if the number-of-revolutions limit value calculated in Step S2 is stored in the memory separately from the target number of revolutions, Step S10 may be omitted. Subsequently, in Step S11, the control device 40 determines whether the commanded number of revolutions is lower than or equal to the number-of-revolutions limit value. If the commanded number of revolutions is lower than or equal to the number-of-revolutions limit value, the control device 40 advances the control process to Step S12 and sets the commanded number of revolutions to the target number of revolutions. Next, the control device 40 advances the control process to Step S13 and calculates the increase or decrease rate using the target number of revolutions and the current number of revolutions. The control device 40 then advances the control process to Step S14 and determines whether the calculated increase or decrease rate is higher than the corresponding upper limit value. If the calculated increase or decrease rate is higher than the upper limit value, the control device 40 advances the control process to Step S15 and controls the drive of the electric motor 11 at the calculated increase or decrease rate. If the calculated increase or decrease rate is lower than or equal to the corresponding upper limit value, the control device 40 advances the control process to Step S16 and controls the drive of the electric motor 11 at the increase or decrease rate equal to the upper limit value.

If, in Step S11, the commanded number of revolutions is greater than the number-of-revolutions limit value, the control device 40 advances the control process to Step S17 and sets the number-of-revolutions limit value to the target number of revolutions. The control device 40 then advances the control process to Step S13.

If, in Step S5, the control device 40 has received a command from the air-conditioning ECU 50, the control device 40 advances the control process to Step S18 and determines whether the commanded number of revolutions is greater than or equal to the target number of revolutions (the number-of-revolutions limit value). If the commanded number of revolutions is greater than or equal to the target number of revolutions, the control device 40 advances the control process to Step S6 without updating the current target number of revolutions. If the commanded number of revolutions is lower than the target number of revolutions, the control device 40 advances the control process to Step S12.

Next, with reference to FIG. 3, the manner in which the number of revolutions of the electric motor 11, which is controlled by the control device 40, changes due to changes in the commanded number of revolutions and the number-of-revolutions limit value will be described.

Figure 3:
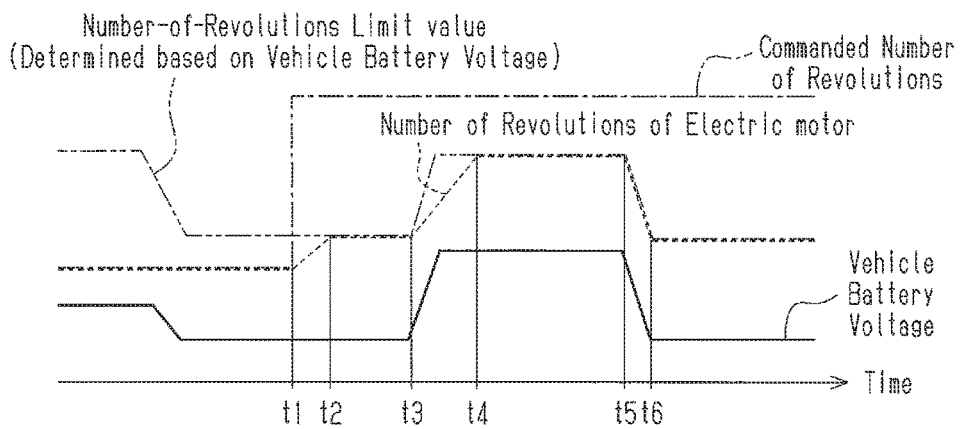
FIG. 3 is a timing chart representing the relationship among the vehicle battery voltage, the commanded number of revolutions, the maximum number-of-revolutions limit value, and the actual number of revolutions.
Figure 4:
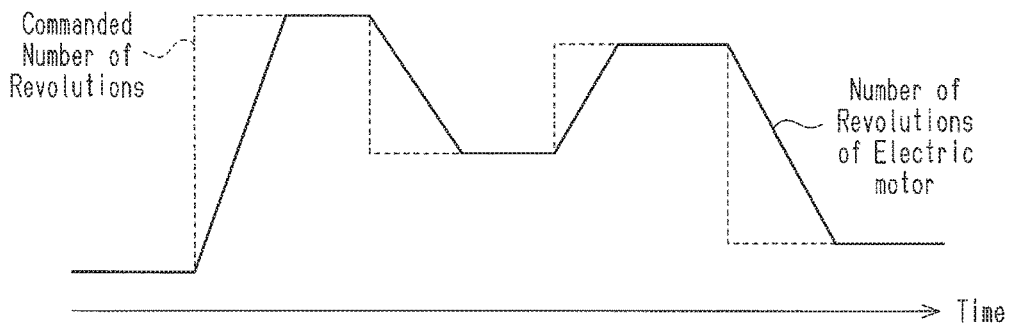
FIG. 4 is a timing chart representing the relationship between the actual number of revolutions and the commanded number of revolutions in a conventional art.
Figure 5:
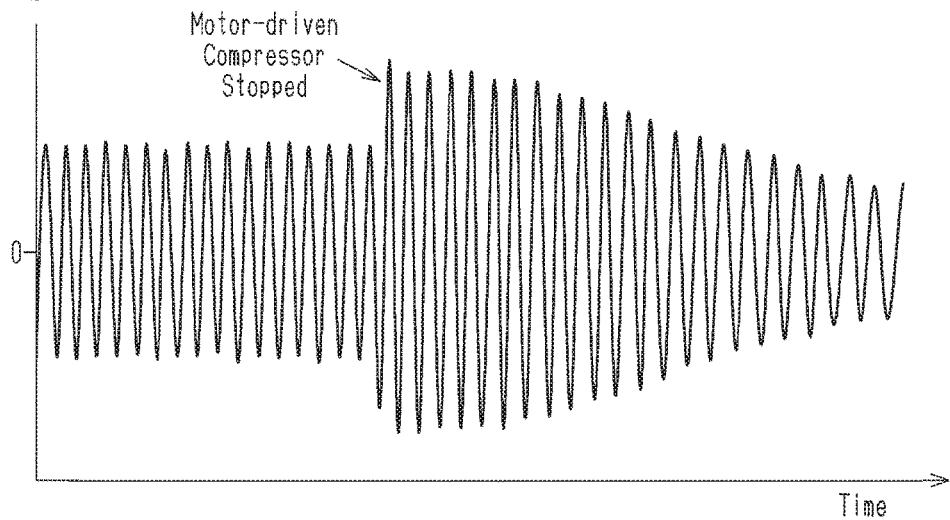
FIG. 5 is a timing chart representing change of the motor electric current amount before and after the motor-driven compressor is stopped.

As shown in FIG. 3, before point in time t1, the electric motor 11 is in a state driven at a number of revolutions lower than the number-of-revolutions limit value. If, at the point in time t1, the control device 40 receives a command corresponding to a number of revolutions that is greater than the current number of revolutions and is greater than the number-of-revolutions limit value from the air-conditioning ECU 50, the electric motor 11 is controlled such that the number of revolutions of the electric motor 11 reaches the number-of-revolutions limit value at an increase rate lower than or equal to the corresponding upper limit value. As a result, at point in time t2, the number of revolutions of the electric motor 11 reaches the number of revolutions equal to the number-of-revolutions limit value.

Although the commanded number of revolutions is greater than the current number of revolutions after the point in time t2, the number-of-revolutions limit value is not changed from the point in time t2 to point in time t3. The electric motor 11 is thus not accelerated. Specifically, even if the commanded number of revolutions is greater than the current number of revolutions, the electric motor 11 is not accelerated when in a state in which the number of revolutions of the electric motor 11 is equal to the number-of-revolutions limit value.

When the vehicle battery voltage starts to increase at the point in time t3, the number-of-revolutions limit value also starts to increase at a constant increase rate based on the vehicle battery voltage. Therefore, the electric motor 11 is controlled such that the current number of revolutions reaches the number-of-revolutions limit value at an increase rate lower than or equal to the corresponding upper limit value. At this time, the increase rate of the number-of-revolutions limit value is higher than the upper limit value of the increase rate. As a result, the number of revolutions of the electric motor 11 reaches the number of revolutions equal to the number-of-revolutions limit value with a delay with respect to the time at which the number-of-revolutions limit value reaches the number of revolutions corresponding to the vehicle battery voltage, in other words, at point in time t4. The number of revolutions of the electric motor 11 is not changed until point in time t5, at which the vehicle battery voltage starts to decrease.

The vehicle battery voltage starts to decrease at the point in time t5 and stops decreasing at point in time t6. The number-of-revolutions limit value also decreases together with the vehicle battery voltage in the period from the point in time t5 to the point in time t6. In the present embodiment, the decrease rate of the number-of-revolutions limit value is higher than the upper limit value of the decrease rate of the number of revolutions of the electric motor 11. Therefore, the electric motor 11 is controlled to be driven such that the number of revolutions of the electric motor 11 reaches the number of revolutions equal to the number-of-revolutions limit value at a decrease rate exceeding the upper limit value of the decrease rate.

The present embodiment achieves the following advantages.

The control device 40 controls the drive of the electric motor 11, which is arranged in a motor-driven compressor that is configured to be installed in a vehicle with the vehicle battery E serving as the power source for the compressor. The control device 40 has the upper limit value of the increase rate of the number of revolutions per unit time of the electric motor 11 and the upper limit value of the decrease rate of the number of revolutions per unit time of the electric motor 11. The control device 40 sets a target number of revolutions and controls the electric motor 11 to be driven such that the number of revolutions of the electric motor 11 becomes equal to the target number of revolutions. When the target number of revolutions is set to the number of revolutions of the electric motor 11 requested by the air-conditioning ECU 50, the control device 40 changes the number of revolutions of the electric motor 11 at either an increase rate lower than or equal to the upper limit value of the increase rate or a decrease rate lower than or equal to the upper limit value of the decrease rate. If the target number of revolutions is set to the number-of-revolutions limit value, which is determined based on the voltage of the battery, the control device 40 decreases the number of revolutions of the electric motor at a decrease rate exceeding the upper limit value of the decrease rate when necessary.

In this case, even if the voltage of the vehicle battery E decreases rapidly, the number of revolutions of the electric motor 11 is rapidly decreased based on such voltage decrease of the vehicle battery E. This restrains damage to switching elements of the inverter 12 of the motor-driven compressor 10 due to increase of the electric current caused by stopping the motor-driven compressor 10.

The above described embodiment may be modified as follows.

The increase rate at which the number of revolutions of the electric motor 11 is increased to the target number of revolutions and the decrease rate at which the number of revolutions of the electric motor 11 is decreased to the target number of revolutions both do not necessarily have to be constant until the number of revolutions of the electric motor 11 reaches the target number of revolutions but may be varied.

To decrease the number of revolutions of the electric motor 11 at the time the vehicle battery voltage decreases, the decrease rate of the number of revolutions does not always have to be greater than the corresponding upper limit value. The decrease rate may be lower than or equal to the upper limit value if, for example, the difference between the number-of-revolutions limit value, which has decreased due to decrease of the vehicle battery voltage, and the current number of revolutions of the electric motor 11 is small.

In the above illustrated embodiment, when the number-of-revolutions limit value as the target number of revolutions, the number of revolutions of the electric motor 11 can be increased at an increase rate higher than or equal to the corresponding upper limit value. However, any other suitable configuration is allowed as long as, at least, the number of revolutions of the electric motor 11 can be decreased at a decrease rate higher than or equal to the corresponding upper limit value. For example, the target number of revolutions and the current number of revolutions may be compared to each other at a point in time between Step S6 and Step S7 of FIG. 2. If the target number of revolutions is greater than the current number of revolutions, the control process may be advanced to Step S7. If the current number of revolutions is greater than the target number of revolutions, the control process may be advanced to Step S14.

The upper limit value of the increase rate may be either equal to or unequal to the upper limit value of the decrease rate.

As the power switching elements Qu1 to Qw2 of the inverter 12, power MOSFETs may be employed instead of IGBTs. The power MOSFETs each have a parasitic diode. The parasitic diodes function as the diodes Du1 to Dw2, which are connected to the power switching elements Qu1 to Qw2. This makes it unnecessary to connect the diodes Du1 to Dw2, which is troublesome, and simplifies the configuration.

As long as the motor-driven compressor 10 is used in a vehicle, the motor-driven compressor 10 may be used in any suitable device, such as a forced induction device, other than an air conditioner configured to be installed in a vehicle.

The control device is not restricted to the air-conditioning ECU 50.

As long as the motor-driven compressor 10 includes a drive section that is rotated and driven by a motor, the motor-driven compressor 10 may be any suitable compressor, which is, for example, a turbo compressor such as a centrifugal compressor and an axial compressor, or a displacement compressor such as a swash-plate compressor, a scroll compressor, and a reciprocating compressor.

The invention claimed is:

1. A method for controlling acceleration and deceleration of a motor-driven compressor configured to be installed in a vehicle, the motor-driven compressor including an electric motor driven with supply of electric power from a battery and a control section that controls drive of the electric motor, wherein the control section has an upper limit value of an increase rate of a number of revolutions per unit time of the electric motor and an upper limit value of a decrease rate of the number of revolutions per unit time of the electric motor, the control section sets a target number of revolutions and controls the electric motor to be driven such that the number of revolutions of the electric motor becomes equal to the target number of revolutions, if the control section sets the target number of revolutions to a number of revolutions of the electric motor requested by another control section, the control section changes the number of revolutions of the electric motor at an increase rate lower than or equal to the upper limit value of the increase rate or a decrease rate lower than or equal to the upper limit value of the decrease rate, and if the control section sets the target number of revolutions to a number-of-revolution limit value determined based on a voltage of the battery, the control section is able to decrease the number of revolutions of the electric motor at a decrease rate that exceeds the upper limit value of the decrease rate.

2. A motor-driven compressor configured to be installed in a vehicle, comprising:

an electric motor driven with supply of electric power from a battery; and a control section that controls drive of the electric motor, wherein the control section has an upper limit value of an increase rate of a number of revolutions per unit time of the electric motor and an upper limit value of a decrease rate of the number of revolutions per unit time of the electric motor, the control section sets a target number of revolutions and controls the electric motor to be driven such that the number of revolutions of the electric motor becomes equal to the target number of revolutions, if the control section sets the target number of revolutions to a number of revolutions of the electric motor requested by another control section, the control section changes the number of revolutions of the electric motor at an increase rate lower than or equal to the upper limit value of the increase rate or a decrease rate lower than or equal to the upper limit value of the decrease rate, and if the control section sets the target number of revolutions to a number-of-revolution limit value determined based on a voltage of the battery, the control section is able to decrease the number of revolutions of the electric motor at a decrease rate that exceeds the upper limit value of the decrease rate.

* * * * *